United States Patent [19]
Leppert et al.

[11] Patent Number: 5,672,079
[45] Date of Patent: Sep. 30, 1997

[54] COAXIAL CONNECTOR FOR MANUFACTURING A COAXIAL HIGH FREQUENCY CABLE

[75] Inventors: Hans-Detlef Leppert; Karl Schulze-Buxloh, both of Mönchengladbach, Germany

[73] Assignee: Alcatel Kabel AG & Co., Germany

[21] Appl. No.: 534,968

[22] Filed: Sep. 26, 1995

[30] Foreign Application Priority Data

Oct. 12, 1994 [DE] Germany ............... 44 36 342.7

[51] Int. Cl.$^6$ ................................. H01R 9/05
[52] U.S. Cl. ................................. 439/578; 385/89
[58] Field of Search ............... 385/88, 89; 439/578–585, 439/675, 63

[56] References Cited

U.S. PATENT DOCUMENTS

| | | | |
|---|---|---|---|
| 4,779,948 | 10/1988 | Wais et al. | 385/88 |
| 4,896,939 | 1/1990 | O'Brien | 350/96.23 |
| 5,219,299 | 6/1993 | Wang | 439/582 |
| 5,226,838 | 7/1993 | Hsu | 439/582 |
| 5,285,511 | 2/1994 | Akkapeddi et al. | 439/582 |

FOREIGN PATENT DOCUMENTS

| | | |
|---|---|---|
| 0194968 | 9/1986 | European Pat. Off. |
| 0382374 | 9/1994 | European Pat. Off. |

*Primary Examiner*—J. J. Swann
*Attorney, Agent, or Firm*—Ware, Fressola, Van Der Sluys & Adolphson LLP

[57] ABSTRACT

A coaxial connector (1) is adapted for use with a coaxial high frequency cable having an external conductor which concentrically surrounds and is spaced from a tube-shaped internal conductor with at least one optical wave guiding element therein. The coaxial connector has an internal contact part (5), which can be electrically connected with the internal conductor of the high frequency cable, and is positioned concentric with a longitudinal axis of the connector. A plug-in element (15), which is electrically connected to the internal contact part (5), is angled with respect to the longitudinal axis of the connector. The plug-in element (15) is surrounded by a ferrule terminal (21), with a space between them, which can be electrically connected to the external conductor of the high frequency cable. The at least one optical wave guiding element, which is located inside the tube-shaped internal conductor of the high frequency cable, can exit in a simple manner from the coaxial connector (1) through a concentric passage hole (9) in the internal contact part (5).

5 Claims, 1 Drawing Sheet

5,672,079

COAXIAL CONNECTOR FOR MANUFACTURING A COAXIAL HIGH FREQUENCY CABLE

BACKGROUND OF THE INVENTION

The invention involves a coaxial connector for a coaxial high frequency cable having a tube-shaped internal conductor concentrically surrounded by an external conductor, with a space between them. The coaxial connector includes (1) an internal contact that is concentric with the longitudinal axis and can be electrically connected to the internal conductor of the high frequency cable, (2) a plug-in element that is electrically connected to the internal contact part and is positioned at an angle with respect to the longitudinal axis and (3) a ferrule terminal, which can be electrically connected to the external conductor of the high frequency cable and at least partially surrounds the plug-in element with a space between them (EP 0 194 968 A2).

It has been suggested to provide the internal conductor of coaxial high frequency cables with a tubular shape and to place at least one optical wave guiding element in this tube-shaped internal conductor, for optical communications. To manufacture such a combined coaxial high frequency and optical wave guiding cable, it is necessary to provide an outlet for the optical wave guiding element in the coaxial connector.

The coaxial connector of EP 0 194 968 A2 does not provide a simple and cost-effective coaxial connector for a combined coaxial high frequency and optical wave guiding cable. It does not provide a simple outlet in the coaxial connector for the at least one optical wave guiding element.

SUMMARY OF THE INVENTION

It is an object of the present invention to provide a coaxial connector having a passage hole formed in an internal contact part, so that at least one optical wave guiding element located in the tube-shaped internal conductor of the high frequency cable can exit from the coaxial connector therethrough.

It is also an object of the invention to provide for the simple manufacture of a combined coaxial high frequency and optical wave guiding cable, with a central outlet for the at least one optical wave guiding element. The coaxial connector of the invention is simple to manufacture and cost-effective, and can be mounted without great effort to one end of a combined coaxial high frequency and optical wave guiding cable. The high frequency transmission of the coaxial connector of the invention is only affected to a minor degree. The straight, centrally located outlet for the optical wave guiding element(s) is well protected against damage up to shortly before its further connection, and does not require any bending.

It is a further object to provide for a simple connection of the coaxial connector to a socket of an external device by including a plug-in element and a ferrule terminal formed at a 90° angle with the longitudinal axis of the connector.

To ensure effective protection of the optical wave guiding element against damage, it is advantageous if the optical wave guiding element can exit from the coaxial connector through a guide tubelet inserted into the passage hole of the internal contact part.

It is an advantage if the guide tubelet is made of metal and is coated with a plastic material on the inside and/or the outside wall, to prevent an electrical short circuit between the internal conductor and the external conductor of the coaxial high frequency cable in the coaxial connector's mounted position.

For a particularly simple construction of the coaxial connector, it is advantageous if the internal contact part and the plug-in element are constructed as a combined unit.

The invention will be fully understood when reference is made to the following detailed description taken in conjunction with the accompanying drawing.

DETAILED DESCRIPTION OF THE INVENTION

Figure 1:
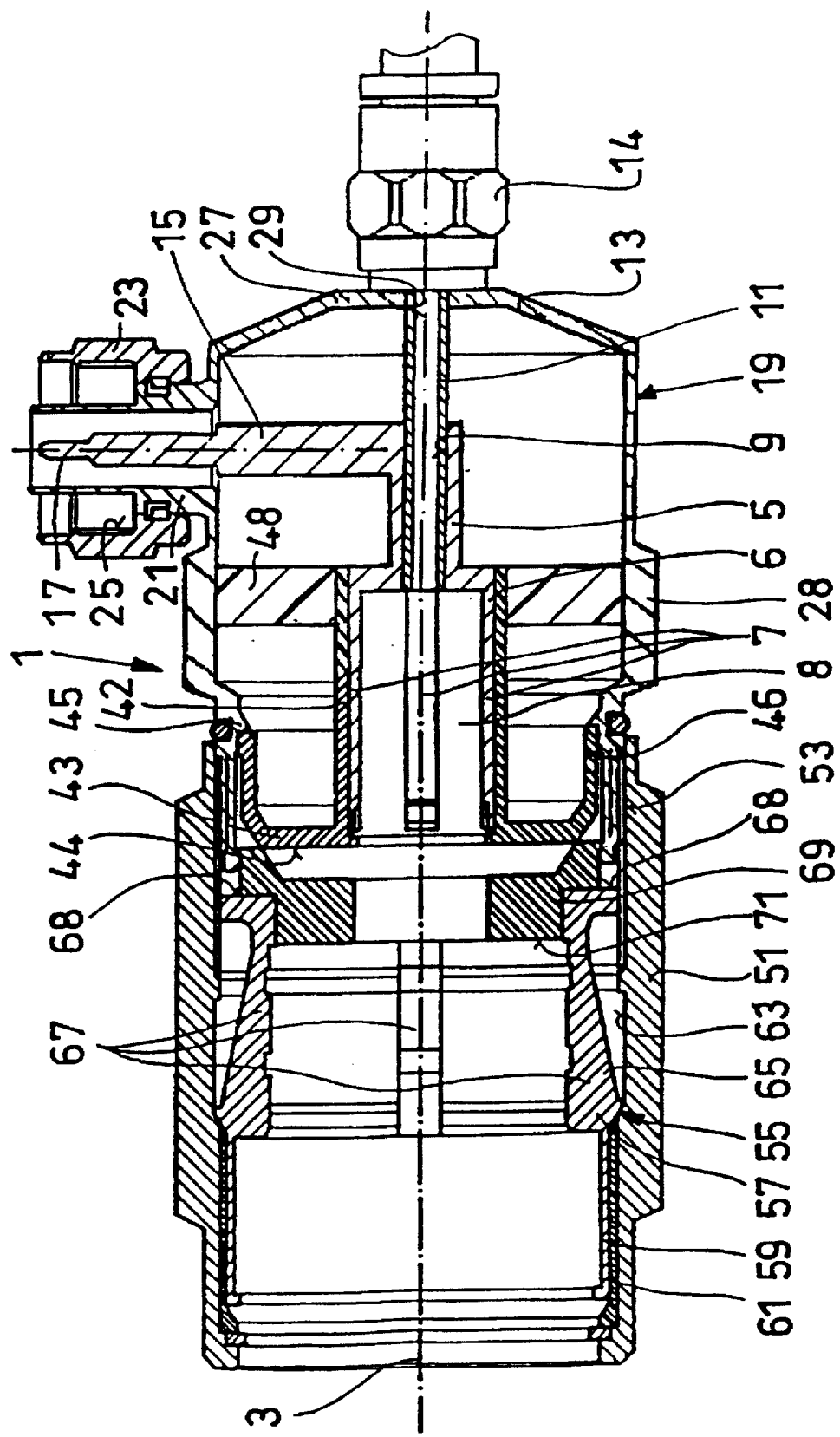
FIG. 1 is a cross-sectional view of the coaxial connector of the invention.

A coaxial connector, generally indicated by the numeral 1, is used to manufacture a combined coaxial high frequency and optical wave guiding cable that contains a tube-shaped internal conductor with at least one optical wave guiding element, and an external conductor which concentrically surrounds the tube-shaped internal conductor, with a space between them. The coaxial connector 1 contains an internal contact part 5, which concentrically extends along the longitudinal axis of the plug, and can be electrically connected to the internal conductor of the combined coaxial high frequency and optical wave guiding cable. The internal contact part 5 is approximately tubular in shape and has four contacts 7 (only three are shown) at one end 6, which form a near circle. An approximately cylindrical receptacle 8 of the coaxial connector 1, which is surrounded by the contacts 7, is able to receive the tube-shaped internal conductor of the end of the coaxial cable to be contacted, which is exposed prior to the insertion into the coaxial connector 1. The contacts 7 are constructed so that they apply an internally directed radial pretension to the periphery of the tube-shaped internal conductor thereby producing a good electrical contact with the internal conductor.

The internal contact part 5 contains a passage hole 9, which is concentric with the longitudinal axis 3 of the coaxial connector 1 and makes contact with the receptacle 8. A guide tubelet 11 is located within the passage hole 5 by being pressed therein. The guide tubelet 11 may be made of plastic or metal and extends from the receptacle 8 to one end 13 of the coaxial connector 1. The guide tubelet 11 serves to lead at least one optical wave guiding element, which is located in the tube-shaped internal conductor of the combined coaxial high frequency and optical wave guiding cable, out of the coaxial connector 1. An optical coupling element 14, used to further connect optical wave guiding elements, is provided at the end 13 of the coaxial connector 1.

If the guide tubelet 11 is made of metal, its inner and/or its outer wall are coated with an electrically insulating plastic to prevent an electrical short circuit between the internal conductor and the external conductor of the coaxial high frequency cable.

A plug-in element 15 is located at the end of the internal contact part 5 opposite from the receptacle 8 and forms a 90° angle with the longitudinal axis 3. The plug-in element 15 makes electrical contact with the internal contact part 5. As shown in the FIG. 1, the plug-in element 15 and the internal contact part 5 can be constructed as an integral unit. On its end opposite from the longitudinal axis 3 of the coaxial connector 1, the plug-in element 15 has a contact pin 17 that extends normal to the longitudinal axis 3.

The coaxial connector 1 has an approximately pot-shaped housing part 19 with a cylindrical section 28 concentrically surrounding the internal contact part 5 in the radial direction. The cylindrical section 28 is spaced from the longitudinal axis 3. A ferrule terminal 21 is attached to the cylindrical section 28 of the housing part 19, which is made of an electrically conductive material, and extends outward in the radial direction of the coaxial connector 1 and concentric with the plug-in element 15, thus at a 90° angle with respect to the longitudinal axis 3. The ferrule terminal 21 partially surrounds the plug-in element 15 in the axial direction and is spaced therefrom. When the coaxial connector 1 is pushed onto one end of a coaxial high frequency cable, the ferrule terminal 21 is able to make electrical contact with the cable's external conductor. A ring-shaped attachment part 23 is connected to the ferrule terminal 21 and contains an internal thread 25. The attachment part 23 with the internal thread 25 serves to connect the coaxial connector 1 with a connecting socket of a device (not shown).

The housing part 19 has a radial section 27 at the end facing the optical coupling element 14, which extends at least partially in the radial direction of the coaxial connector 1, and contains a holding bore 29 which passes through and is concentric with the longitudinal axis 3. The end of the guide tubelet 11 opposite from receptacle 8 is pushed through this holding bore 29 and in this way is kept centered in coaxial connector 1, immediately adjacent to the optical coupling element 14.

A pin bushing 43 with a first cylindrical section 42 is pushed into the periphery of the internal contact part 5, in the area of the contacts 7. At the end that faces opposite from the radial section 27 of housing part 19, the pin bushing 43 has an extending radial section 44, which extends radially outward from the first cylindrical section 42. Starting from the radial section 44 and concentric with the longitudinal axis 3 is a second cylindrical section 46. The second cylindrical section 46 extends in the direction of the radial section 27 of housing part 19 so as to abut against the internal wall of cylindrical section 28 of housing part 19 and against a retaining step 45 of cylindrical section 28 of housing part 19.

An annular support element 48, which is made of an electrically insulating material, is located between the periphery of the first cylindrical section 42 of pin bushing 43 and the wall of the cylindrical section 28 of housing part 19, and supports the internal contact part 5 with respect to housing part 19. In this way, the centralization of the internal contact part 5 inside of housing part 19 is ensured.

At the end opposite from the radial section 27, the cylindrical section 28 of housing part 19 is connected to a tube-shaped metal clamping sleeve 51 by means of a thread 53. A clamping device 55 has a clamping element 57 located in the metal clamping sleeve 51 and serves to hold the coaxial connector 1 to the combined coaxial high frequency and optical wave guiding cable to establish electrical contact with the external conductor of the cable. In a cylindrical section 59 that faces away from housing part 19, the tubular clamping element 57, which is made of an electrically conductive material, is tightly clamped by means of a cylindrical clamping element 61 in a longitudinal bore 63 of the tube-shaped clamping sleeve 51, and has a contact area 65 with a decreased open width, which faces the housing part 19. When the coaxial connector 1 is pushed onto a combined coaxial high frequency and optical wave guiding cable, the external conductor of the cable makes electrical contact with four contact strips 67 (only three shown) in the contact area 65 of clamping element 57. The contact strips 67 arranged in the approximate shape of a circle and are sprung inward in the radial direction, so that they make contact with the periphery of the external conductor in the installed position. Adjacent the internal contact part 5, the deformation of the contact strips 67 or their position in the radial inward direction is limited by the periphery of a circular intermediate part 69. The surface 71 of intermediate part 69, which faces away from the internal contact part 5, serves as an axial contact surface for a step in the coaxial high frequency cable. The surfaces 68 of the contact strips 67, which face the housing part 19, lie in the axial direction against the intermediate part 69 near the thread 53. The external conductor of a coaxial cable makes electrical contact with the ferrule terminal 21 of coaxial connector 1 through the contact strips 67 of the clamping element 57, the clamping sleeve 51, the thread 53 and the housing part 19.

The preferred embodiment described above admirably achieves the objects of the invention. However, it will be appreciated that departures can be made by those skilled in the art without departing from the spirit and scope of the invention which is limited only by the following claims.

What is claimed:

1. A coaxial connector for a coaxial high frequency cable having an external conductor which concentrically surrounds and is spaced from a tubular internal conductor having at least one optical waveguiding element therein, the coaxial connector comprising:

(a) an internal contact part concentric with a longitudinal axis of the coaxial connector and adapted to establish electrical contact with the internal conductor of the coaxial high frequency cable, the internal contact part defining a passage hole concentric with the longitudinal axis of the coaxial connector and through which the at least one optical wave guiding element located in the tubular internal conductor of the high frequency cable can exit from the coaxial connector;

(b) a plug-in element electrically connected to the internal contact part and positioned at an angle with respect to the longitudinal axis of the coaxial connector; and (c) a ferrule terminal adapted to be electrically connected to the external conductor of the high frequency cable and at least partially surrounding the plug-in element with a space therebetween.

2. A coaxial connector as claimed in claim 1, wherein the plug-in element and the ferrule terminal are positioned at a 90° angle with respect to the longitudinal axis of the coaxial connector.

3. A coaxial connector as claimed in claim 1, further including a guide tubelet inserted into the passage hole of the internal contact part, the at least one optical waveguiding element exits from the coaxial connector through the guide tubelet.

4. A coaxial connector as claimed in claim 3, wherein the guide tubelet is made of a metal and is insulated to prevent an electrical short-circuit between the internal and external conductors.

5. A coaxial connector as claimed in claim 1, wherein the internal contact part and the plug-in element are an integral unit.

* * * * *